(12) United States Patent
Pastor et al.

(10) Patent No.: US 9,663,142 B2
(45) Date of Patent: May 30, 2017

(54) METHODS AND SYSTEMS FOR ALIGNING A STEERING SYSTEM OF A VEHICLE

(71) Applicant: GM GLOBAL TECHNOLOGY OPERATIONS LLC, Detroit, MI (US)

(72) Inventors: Stephen R. Pastor, Farmington Hills, MI (US); Phanu Amatyakul, Brighton, MI (US); Keun Jae Kim, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/845,779

(22) Filed: Sep. 4, 2015

(65) Prior Publication Data

US 2015/0375778 A1 Dec. 31, 2015

Related U.S. Application Data

(63) Continuation-in-part of application No. 14/102,774, filed on Dec. 11, 2013, now abandoned.

(51) Int. Cl.
*B62D 6/00* (2006.01)
*B62D 7/15* (2006.01)
*B62D 9/00* (2006.01)

(52) U.S. Cl.
CPC ............. *B62D 6/002* (2013.01); *B62D 7/159* (2013.01); *B62D 9/00* (2013.01)

(58) Field of Classification Search
CPC .......... B62D 6/00; B62D 6/002; B62D 6/005; B62D 9/00; B62D 7/159
USPC .......................................................... 701/41
See application file for complete search history.

(56) References Cited

U.S. PATENT DOCUMENTS

| 4,669,745 A | * | 6/1987 | Miki | .................. | B62D 7/1536 180/410 |
| 4,700,960 A | * | 10/1987 | Miki | .................... | B62D 7/159 180/414 |
| 4,720,790 A | * | 1/1988 | Miki | .................... | B62D 7/159 180/415 |
| 4,926,955 A | * | 5/1990 | Ohmura | ................ | B62D 7/148 180/414 |
| 4,951,199 A | * | 8/1990 | Whitehead | .............. | B62D 7/22 180/446 |
| 6,301,534 B1 | * | 10/2001 | McDermott, Jr. | ..... | B62D 5/001 701/41 |

(Continued)

FOREIGN PATENT DOCUMENTS

CN           102105342 A      6/2011

OTHER PUBLICATIONS

State Intellectual Property Office of the Peoples Republic of China, Office Action in Chinese Patent Application No. 201410754550.2 mailed Aug. 30, 2016.

*Primary Examiner* — Atul Trivedi
(74) *Attorney, Agent, or Firm* — Lorenz & Kopf, LLP

(57) ABSTRACT

Methods and systems are provided for aligning a steering system of a vehicle. In one embodiment, a method includes: determining when the vehicle is driving a straight-line path; determining a steering wheel position error when the vehicle is driving the straight-line path; computing a rear wheel steering offset based on the steering wheel position error and a closed loop control method; and generating a control signal to a rear wheel steering system based on the rear wheel steering offset.

20 Claims, 4 Drawing Sheets

(56) References Cited

U.S. PATENT DOCUMENTS

| | | | |
|---|---|---|---|
| 6,574,539 B1* | 6/2003 | Ashrafi | G01M 17/06 180/422 |
| 6,970,777 B2 | 11/2005 | Tange et al. | |
| 7,246,679 B2 | 7/2007 | Kasahara et al. | |
| 8,977,433 B2* | 3/2015 | Kojima | B62D 5/0463 180/446 |
| 2001/0013441 A1* | 8/2001 | Furumi | B62D 7/148 180/412 |
| 2004/0140147 A1* | 7/2004 | Laurent | B62D 5/003 180/402 |
| 2006/0058935 A1* | 3/2006 | Ghoneim | B62D 6/003 701/41 |
| 2006/0080016 A1* | 4/2006 | Kasahara | B62D 5/006 701/41 |
| 2007/0029129 A1* | 2/2007 | Shiozawa | B62D 6/04 180/446 |
| 2009/0030575 A1* | 1/2009 | Kleinau | B62D 6/04 701/44 |
| 2009/0095562 A1 | 4/2009 | Yasui et al. | |
| 2009/0125187 A1* | 5/2009 | Yamamoto | B62D 5/0457 701/42 |
| 2009/0192679 A1* | 7/2009 | Kobayashi | B62D 5/0463 701/42 |
| 2009/0299573 A1* | 12/2009 | Thrun | B62D 15/025 701/41 |
| 2011/0071727 A1* | 3/2011 | Bechtler | G01D 3/08 701/29.2 |
| 2011/0106382 A1 | 5/2011 | Kageyama | |
| 2012/0035810 A1* | 2/2012 | Mukai | B62D 5/008 701/41 |
| 2012/0041644 A1 | 2/2012 | Turner | |
| 2012/0158246 A1* | 6/2012 | Takashima | B62D 7/159 701/41 |
| 2012/0277956 A1* | 11/2012 | Sasaki | B62D 7/159 701/41 |
| 2013/0060414 A1* | 3/2013 | Lee | B62D 1/286 701/23 |
| 2013/0245892 A1* | 9/2013 | Chen | B62D 6/002 701/42 |
| 2014/0207336 A1* | 7/2014 | Oblizajek | B62D 15/025 701/42 |
| 2015/0025743 A1* | 1/2015 | Tamura | B62D 5/046 701/41 |
| 2015/0158525 A1* | 6/2015 | Pastor | B62D 6/002 701/41 |
| 2015/0291210 A1* | 10/2015 | Kageyama | B60T 8/1755 701/41 |
| 2016/0037706 A1* | 2/2016 | Bebernes | A01B 69/007 180/403 |

* cited by examiner

METHODS AND SYSTEMS FOR ALIGNING A STEERING SYSTEM OF A VEHICLE

CROSS REFERENCE TO RELATED APPLICATIONS

This application is a continuation in part of U.S. application Ser. No. 14/102,774, filed Dec. 11, 2013, which is hereby incorporated by reference in its entirety.

TECHNICAL FIELD

The present disclosure generally relates to vehicles, and more particularly relates to methods and systems for controlling rear wheel steering systems to align front steering systems of vehicles.

BACKGROUND

A front steering system of a vehicle allows a driver to steer front wheels of the vehicle. A rear steering system of a vehicle can steer rear wheels independently of the front wheels. The front steering system typically includes a steering wheel, a steering wheel angle sensor, a steering shaft connected to the steering wheel, a steering unit connected to the steering shaft and one or more members such as a tie rod connected to the steering unit and a wheel knuckle for the wheel. The steering wheel typically includes a hub connected to the steering shaft, an outer rim spaced from and surrounding the hub and a plurality of spokes interconnecting the hub and rim.

In most vehicles, when the wheels are aligned straight, the steering wheel is oriented such that the spokes of the steering wheel appear level in a home or neutral position. In some instances, the steering wheel may become misaligned during vehicle assembly or in the field, that is, the spokes of the steering wheel are no longer in the home or neutral position. Noticeable deviations from the home or neutral position are typically undesirable to a driver. In some instances, the steering wheel is aligned, but the vehicle may become misaligned, that is the steering wheel is no longer in the home or neutral position when the vehicle is traveling straight. Vehicle misalignment is typically undesirable to a driver.

Accordingly, it is desirable to provide methods and systems for correcting such misalignments. It is also desirable to provide methods and systems for controlling steering systems to correct such misalignments, as well as to provide improved vehicles that include such methods and/or systems. Furthermore, other desirable features and characteristics of the present invention will become apparent from the subsequent detailed description of the invention and the appended claims, taken in conjunction with the accompanying drawings and this background of the invention.

SUMMARY

Methods and systems are provided for aligning a steering system of a vehicle. In one embodiment, a method includes: determining when the vehicle is driving a straight-line path; determining a steering wheel position error when the vehicle is driving the straight-line path; filtering the steering wheel position error; computing a rear wheel steering offset based on the steering wheel position error and a closed loop control method; and generating a control signal to the rear wheel steering system based on the rear wheel steering offset.

In another embodiment, a system includes a rear wheel steering system and a control module. The control module determines a steering wheel position error when the vehicle is driving the straight-line path, filters the steering wheel position error; computes a rear wheel steering offset based on the steering wheel position error and a closed loop control method, and generates a control signal to the rear wheel steering system based on the rear wheel steering offset.

In another embodiment, a vehicle is provided. The vehicle includes a rear wheel steering system, a front wheel steering system, and a control module. The control module determines a misalignment associated with the front wheel steering system, and generates a control signal to the rear wheel steering system based on the misalignment and a closed loop control method.

DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
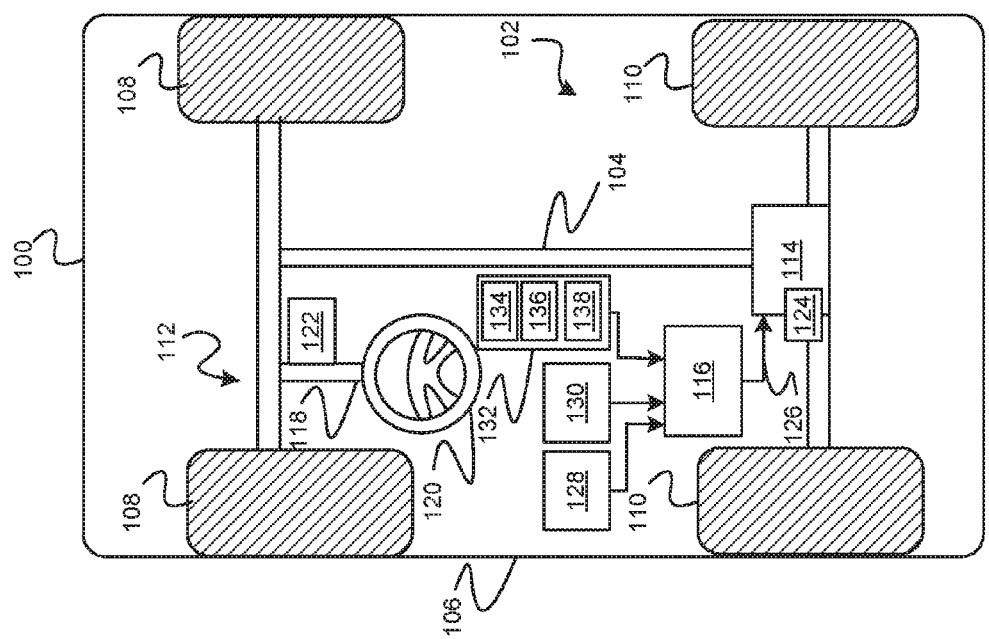
FIG. 1 is a functional block diagram of a vehicle that includes, among other features, a steering misalignment correction system, in accordance with exemplary embodiments.

With reference to FIG. 1, a vehicle 100 is shown that includes a steering misalignment correction system 102 in accordance with various embodiments. Although the figures shown herein depict an example with certain arrangements of elements, additional intervening elements, devices, features, or components may be present in an actual embodiment. It should also be understood that FIG. 1 is merely illustrative and may not be drawn to scale.

As depicted in FIG. 1, the vehicle 100 generally includes a chassis 104, a body 106, front wheels 108, rear wheels 110, a steering system 112, a rear wheel steering system 114, and a control module 116. The body 106 is arranged on the chassis 104 and substantially encloses the other components of the vehicle 100. The body 106 and the chassis 104 may jointly form a frame. The wheels 108-110 are each rotationally coupled to the chassis 104 near a respective corner of the body 106.

As can be appreciated, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

The steering system 112 includes a steering column 118 and a steering wheel 120. In various embodiments, the steering system 112 further includes various other features (not depicted in FIG. 1), such as a steering gear, hydraulic power steering (HPS), intermediate connecting shafts between the column and the gear, connection joints, either flexible or rigid, allowing desired articulation angles between the intermediate connecting shafts, and tie-rods. The steering gear, in turn, comprises a rack, input shaft, and internal gearing.

In various embodiments, the steering system 112 is an Electric Power Steering system (EPS) that includes a motor 122 that is coupled to the steering system 112, and that provides torque or force to a rotatable or translational member of the steering system 112. The motor 122 can be coupled to the rotatable shaft of the steering column 118 or to the rack of the steering gear. In the case of a rotary motor, the motor 122 is typically connected through a geared or belt-driven configuration enabling a favorable ratio of motor shaft rotation to either column shaft rotation or rack linear movement. The steering system 112 in turn influences the steerable front road wheels 108 during steering based upon the assist torque received from the motor 122 along with any torque received from a driver of the vehicle 100 via the steering wheel 120.

The rear wheel steering system 114 is mounted on the chassis 104 or body 106, or rear axle assembly, and may control steering of the rear wheels 110 independently of a steering input given by the driver via the steering wheel 120. The rear wheel steering system 114 similarly includes a motor 124 and various other features such as a gear reduction mechanism, tie-rods, and drive circuitry that is controlled to adjust the steering position of the rear wheels 110.

The control module 116 is communicatively coupled to the rear wheel steering system 114 or is a part of the rear wheel steering system 114, and controls operation thereof. In general, the control module 116 determines a misalignment of the steering wheel 120 of the steering system 112 and generates control signals 126 to the drive circuitry of the rear wheel steering system 114 to control the motor 124 such that the rear wheels 110 are adjusted to a particular angle. By adjusting the rear wheels 110 only to a particular angle, the vehicle 100 is forced to reestablish a new centerline by adjusting the front wheels and correcting the misalignment of the steering wheel 120. In various embodiments, the control module 116 determines the particular angle based on an angular offset of the steering wheel 120 referred to as a steering wheel position error. The control module 116 determines the angular offset of the steering wheel 120 based on sensed and or modeled data. As can be appreciated, the control module 116 may also be coupled to and control various other vehicle devices and systems not shown. A more detailed depiction of the control module 116 is provided in FIG. 2 and discussed further below in connection therewith, in accordance with exemplary embodiments.

As depicted in FIG. 1, the control module 116 receives signals that carry at least some of the data from at least one of a compass 128, a global positioning system (GPS) device 130, and a sensor array 132. The compass 128 measures values indicating a heading of the vehicle 100 at various points in time and generates compass signals that provide such compass heading values. The GPS device 130 receives values as to a heading of the vehicle 100 (e.g., using a non-depicted GPS satellite system) and generates GPS heading signals that provide such GPS heading values. The sensor array 132 includes, but is not limited to, one or more steering wheel position sensors 134, yaw rate sensors 136, and tire rotational speed sensors 138.

The yaw rate sensor 136 measures a yaw velocity of the vehicle 100. The yaw rate sensor 136 provides the yaw velocity values to the control module 116 for processing, including the determination of the position error of the steering wheel 120. The tire rotational speed sensors 138 measure a tire's angular speed. The tire rotational speed sensors 138 provide the tire angular speed values to the control module 116 for processing, including for determining the position error of the steering wheel 120. The steering wheel position sensor 134 measures an angular position of the steering wheel 120. The steering wheel position sensor 134 provides the steering wheel position values to the control module 116 for processing, including the determination of the position error of the steering wheel 120.

Figure 2:
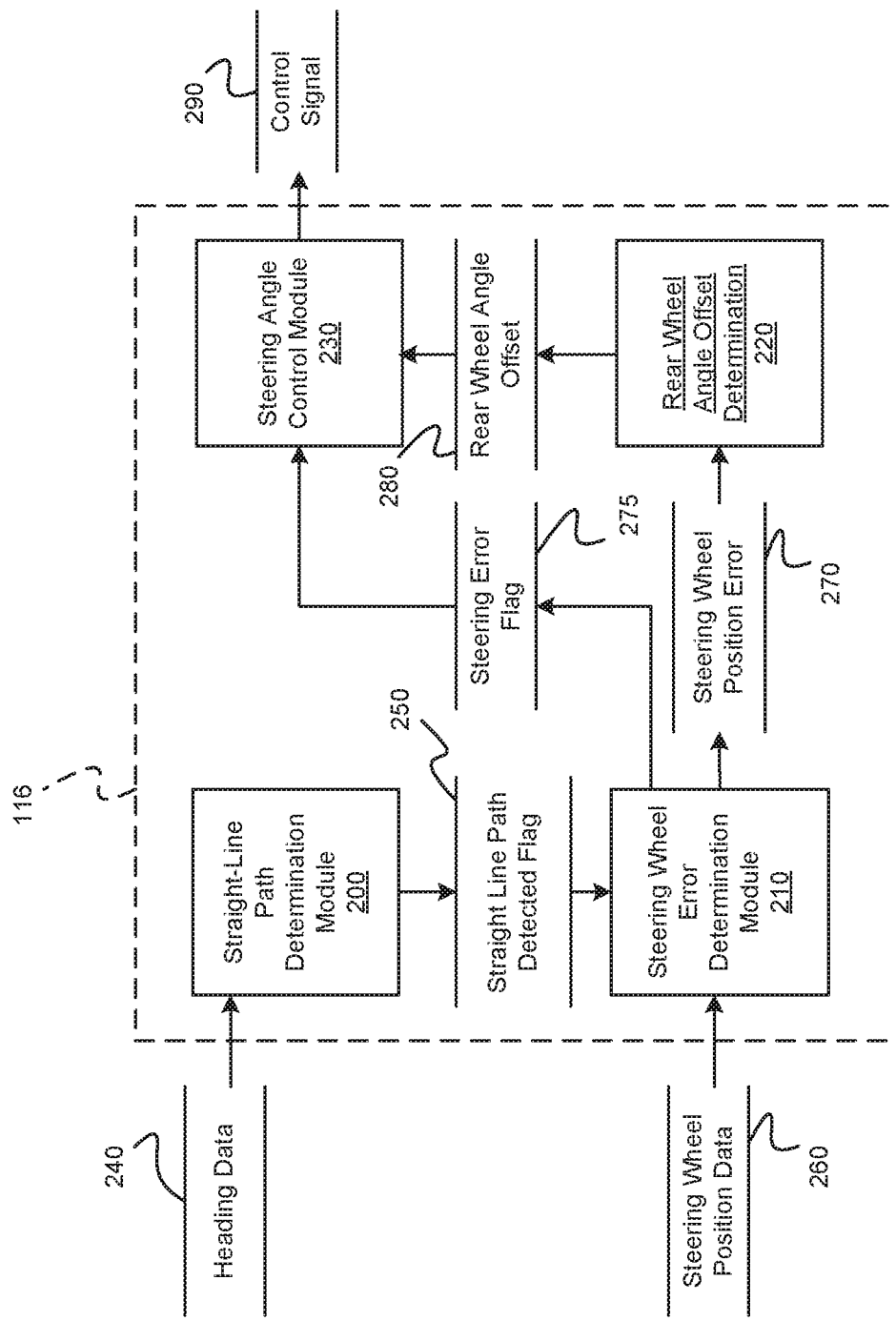
FIG. 2 is a functional block diagram of a control module of the steering misalignment correction system in accordance with exemplary embodiments.

Referring now to FIG. 2 and with continued reference to FIG. 1, a dataflow diagram illustrates the control module 116 of FIG. 1 in accordance with various embodiments. As can be appreciated, various embodiments of the control module 116, according to the present disclosure, may include any number of sub-modules. For example, the sub-modules shown in FIG. 2 may be combined and/or further partitioned to similarly control the rear wheel angle. As discussed above, inputs to the control module 116 may be received from the sensor array 132, received from other control modules (not shown) within the vehicle 100, and/or determined by sub-modules (not shown) within the control module 116. In various embodiments, the control module 116 includes a straight-line path determination module 200, a steering wheel position error determination module 210, an angle offset determination module 220, and a steering angle control module 230.

The straight-line path determination module 200 receives as input heading data 240. The heading data 240 includes data indicating a heading or direction of the vehicle 100 or of the front wheels 108 of the vehicle 100 and can be received from the compass 128, the GPS device 130, the tire rotational speed sensor 138, and/or the yaw rate sensor 136.

Based on the heading data 240, the straight-line path determination module 200 determines whether the vehicle 100 is driving a straight-line path. For example, the straight-line path determination module 200 determines a change in a compass heading, a change in a GPS heading, a yaw velocity, and/or a difference in a tire angular speed between tires of the wheels. The straight-line path determination module 200 compares the determined change (or changes if a change is determined from more than one source) and/or difference to a predetermined threshold(s). For example, if the change(s) and/or difference is less than the predetermined threshold(s), then the vehicle 100 is determined to be driving a straight-line path and a straight line path detected flag 250 is set accordingly. If, however, the change(s) and/or the difference is greater than the predetermined threshold(s), then the vehicle 100 is determined to not be driving a straight-line path and the straight-line path detected flag 250 is set to accordingly.

The steering wheel error determination module 210 receives as input steering wheel position data 260 and the straight-line path detected flag 250. The steering wheel position data 260 includes data indicating an angular position of the steering wheel 120 and can be received from, for example, the steering wheel position sensor 134.

If the straight-line path detected flag 250 indicates that the vehicle 100 is driving a straight-line path, the steering wheel error determination module 210 determines a steering wheel position error 270 while the vehicle 100 is driving straight. For example, the steering wheel error determination module 210 computes the error 270 as a difference between a desired steering wheel position when driving a straight-line path and the current steering wheel position as indicated by the steering wheel position data 260. The desired steering wheel position may be a calibration that is set, for example, during development of the vehicle, during production of the vehicle (e.g., in the plant), and/or after production (e.g., by a service technician).

In various embodiments, the steering wheel error determination module 210 can limit any rear wheel steering control in the event the error 270 is too large. For example, if the error is greater than a predetermined threshold (e.g., 15 degrees), the steering wheel error determination module 210 sets a steering error flag 275 to indicate that the error is too large. If the error 270 is less than or equal to the predetermined threshold, the steering wheel error determination module 210 sets the steering error flag 275 to indicate that the error 270 is within an acceptable range.

The rear wheel angle offset determination module 220 receives as input the steering wheel position error 270. Based on the steering wheel position error 270, the rear wheel angle offset determination module 220 determines a rear wheel angle offset 280. In various embodiments, the rear wheel angle offset determination module 220 computes the rear wheel angle offset 280 according to an open loop control method. For example, the rear wheel angle offset determination module computes the rear wheel angle offset 280 by dividing the steering wheel position error 270 by the front steering gear ratio and subtracting the result from a currently applied rear wheel angle offset. As can be appreciated, the initial value of the currently applied rear wheel angle offset may set to zero or some other number. In various embodiments, the rear wheel angle offset determination module 220 may apply a low pass filter to the steering wheel position error 270 and before dividing by the on center front steering gear ratio. In such embodiments, the accuracy of the rear wheel angle offset 280 is susceptible to the accuracy of the value of the gear ratio, which may be a constant that is calibrated per vehicle.

In various embodiments, the rear wheel angle offset determination module 220 computes the rear wheel angle offset 280 according to a closed loop control method. For example, the rear wheel angle offset determination module 220 computes the rear wheel angle offset 280 using integral control (IC), proportional integral control (PIC), integral derivative control (IDC), or proportional integral derivative control (PIDC). In any such closed loop control, the rear wheel angle offset 280 is computed by applying one or more coefficients associated with the proportional control, integral control, and/or derivative control to the steering wheel position error 270 such that the steering wheel position error 270 is reduced to zero over time. In such embodiments, the accuracy of the rear wheel angle offset 280 is more robust as the computation is not susceptible to the control constant variation such as the steering gear ratio.

The steering angle control module 230 receives as input the rear wheel angle offset 280 and the steering error flag 275. Based on the rear wheel angle offset 280 and the steering error flag 275, the steering angle control module 230 selectively generates a steering control signal 290 to the rear wheel steering system 114. For example, if the steering error flag 275 indicates the error 270 is too large, then a control signal 290 is limited. If, however, the steering error flag 275 indicates that the error 270 is within an acceptable range, then the steering control signal 290 is determined such that it controls the rear wheels 110 to the rear wheel angle offset 280.

Figure 3C:
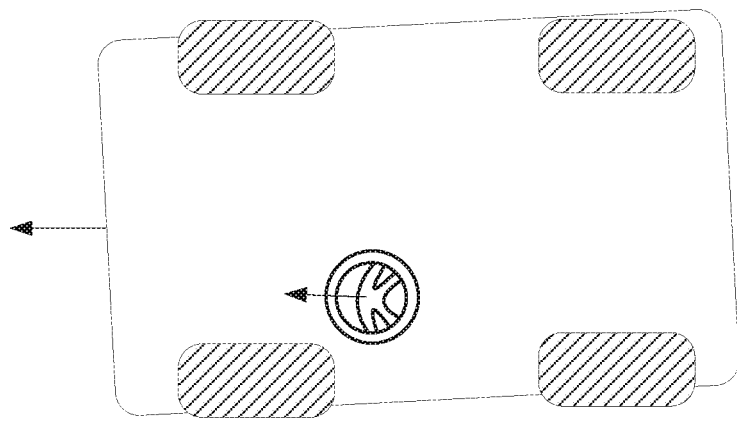
FIGS. 3A-3C are illustrations of operation of the vehicle in accordance with exemplary embodiments.
Figure 3B:
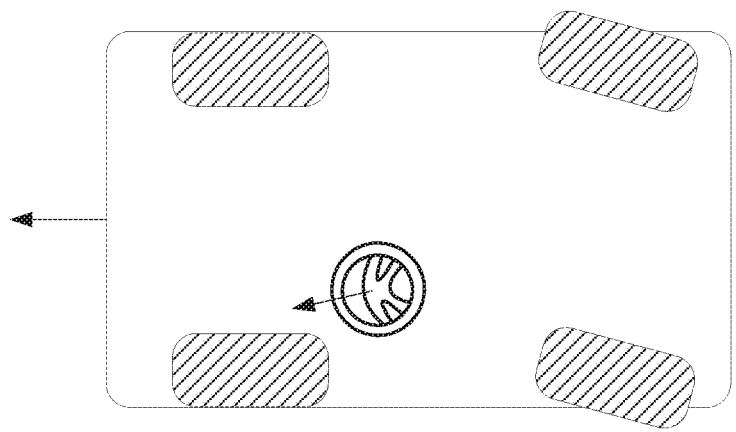
Figure 3A:
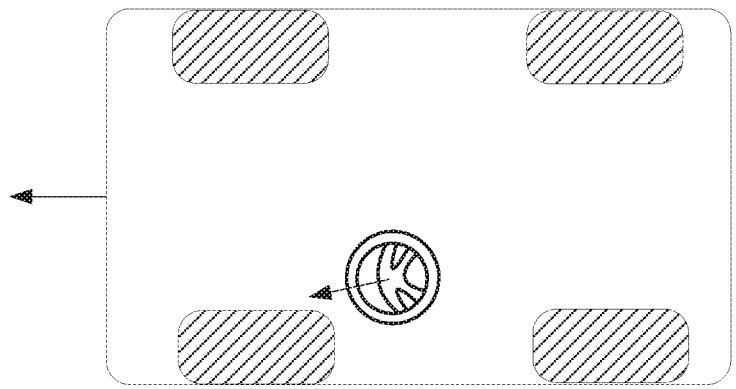

For example, as shown in FIG. 3A, the steering wheel is misaligned by x degrees (e.g., by a negative 5 degrees). The control signal 290 adjusts the rear wheels 110 based on the angle offset 280 as shown in FIG. 3B. By controlling the rear wheels 110 based on the angle offset 280, the front wheels 108 will adjust to the same or similar offset when the vehicle 100 is forced to reestablish a new centerline as shown in FIG. 3C. Thus, the vehicle 100 will be traveling at a slight angle in a straight-line path and the steering wheel misalignment will appear to be level in a home or neutral position to the driver. As can be appreciated, the examples shown in FIG. 3A-3C are exaggerated examples for illustration purpose. In various embodiments, the angle offset 280 of the wheels can be limited such that angle of the vehicle 100 is slight.

Figure 4:
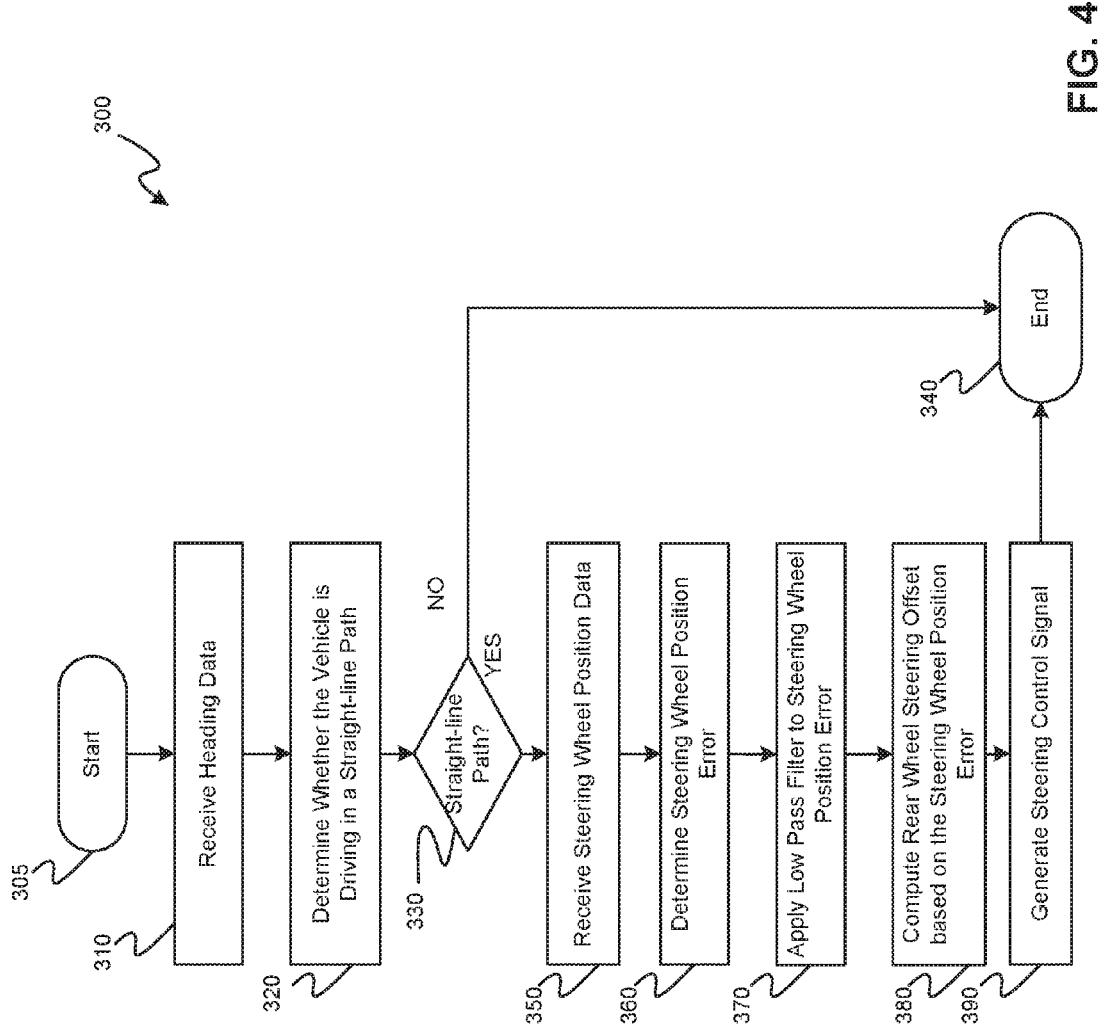
FIG. 4 is a flowchart of a method for correcting a misaligned steering system in accordance with exemplary embodiments.

With reference now to FIG. 4, FIG. 4 is a flowchart of a method 300 for correcting misalignment of a vehicle 100, in accordance with exemplary embodiments. The method 300 can be utilized in connection with the vehicle 100 and the rear steering system 114 of FIG. 1 and can be performed by control module 116 of FIG. 2, in accordance with exemplary embodiments. As can be appreciated in light of the disclosure, the order of operation within the method is not limited to the sequential execution as illustrated in FIG. 4, but may be performed in one or more varying orders as applicable and in accordance with the present disclosure. As can further be appreciated, the method of FIG. 4 may be scheduled to run at predetermined time intervals during operation of the vehicle and/or may be scheduled to run based on predetermined events.

As depicted in FIG. 4, the method may begin at 305. The heading data 240 is received at 310. Based on the heading data 240, it is determined whether the vehicle 100 is driving a straight-line path at 320. In one example, the heading data 240 may include compass heading data. Compass heading values may be measured at various points in time, and provided as the compass heading data. A change in the compass heading values may be calculated. It is determined that the vehicle 100 is driving a straight-line path when the change in compass heading is less than a predetermined threshold. In one such exemplary embodiment, a threshold of approximately one half degree heading change per second may be utilized for certain vehicles. However, this may vary in different embodiments, and the applicable thresholds may be different for each vehicle.

In another example, the heading data 240 may include GPS heading data. GPS heading values may be obtained at various points in time, and provided as the GPS heading data. A change in the GPS heading values may be calculated. It is determined that the vehicle 100 is driving a straight-line path when the change in GPS heading is less than a predetermined threshold. In one such exemplary embodiment, a threshold of approximately one half degree heading change per second may be utilized for certain vehicles. However, this may vary in different embodiments, and the applicable thresholds may be different for each vehicle.

In yet another example, the heading data 240 may include yaw velocity data. Yaw velocity values may be measured at various points in time, and provided as the yaw velocity data. It is determined that the vehicle 100 is driving a straight-line path when the yaw velocity is less than a predetermined threshold. In one such exemplary embodiment, a threshold of approximately one half degrees per second (0.5 deg/sec) may be utilized for certain vehicles. However, this may vary in different embodiments, and the applicable thresholds may be different for each vehicle.

A still another example, the heading data 240 may include tire angular speed data. Tire angular speed values may be sampled at various points in time, and provided as the tire angular speed data. A difference in tire angular speeds (namely, of front wheels 108 or rear wheels 110 that are side-to-side of one another) may be computed. It is determined that the vehicle 100 is driving on a straight-line path when the difference is less than a predetermined threshold. In one such exemplary embodiment, a threshold of approximately one tenth of one percent (0.1%) may be utilized for certain vehicles. However, this may vary in different embodiments, and the applicable thresholds may be different for each vehicle. In one embodiment, the difference of the angular speeds must be below the percentage of the angular speed of either tire for the determination to be made that the vehicle 100 is travelling on a straight-line path.

If it is determined that the vehicle 100 is not driving a straight-line path at 330, the method continues at 390 by generating the steering wheel control signal 290 based on, for example, a previously calculated rear wheel steering offset 280. If, however, it is determined that the vehicle 100 is driving a straight-line path at 330, the steering wheel position data 260 is received at 350. The steering wheel position error 270 is determined based on the steering wheel position data 260 at 360. For example, the steering wheel position error 270 may be computed as a difference between a desired steering wheel position when driving a straight-line path (e.g., a preset desired value representing a home or neutral position) and the current steering wheel position. Optionally, a low pass filter is applied to the steering wheel position error 270 at 370.

The rear wheel steering offset 280 is computed based on the filtered steering wheel position error 270 at 380. For example, the rear wheel steering offset 280 may be computed by dividing the filtered steering wheel position error 270 by the front steering on center gear ratio and subtracting the result from a currently applied rear wheel steering offset. The rear wheel steering control signal 290 is generated at 390 based on the rear wheel steering offset 280. The rear wheels 110 are then adjusted by the offset thereby, forcing the front wheels 108 to become automatically aligned with the rear wheels 110 as the vehicle 100 reestablishes a new centerline. Thereafter, the method may end at 340.

As can be appreciated, the disclosed methods and systems may vary from those depicted in the Figures and described herein. For example, as mentioned above, the vehicle 100 of FIG. 1, the rear steering system 114 and the control module 116 of FIGS. 1 and 2, and/or portions and/or components thereof may vary, and/or may be disposed in whole or in part in any one or more of a number of different vehicle units, devices, and/or systems, in certain embodiments. In addition, it will be appreciated that certain steps of the method 300 may vary from those depicted in FIG. 4 and/or described above in connection therewith. It will similarly be appreciated that certain steps of the method 300 may occur simultaneously or in a different order than that depicted in FIG. 4 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of aligning a steering system of a vehicle, the method comprising:
   determining when the vehicle is driving a straight-line path; and
   determining a steering wheel position error when the vehicle is driving the straight-line path;
   computing a rear wheel steering offset based on the steering wheel position error and a closed loop control method; and
   generating a control signal to a rear wheel steering system based on the rear wheel steering offset.

2. The method of claim 1, wherein the computing the rear wheel steering offset is based on proportional control.

3. The method of claim 1, wherein the computing the rear wheel steering offset is based on integral control.

4. The method of claim 1, wherein the computing the rear wheel steering offset is based on derivative control.

5. The method of claim 1, further comprising applying a low pass filter to the steering wheel position error and wherein the computing the rear wheel steering offset is based on the filtered steering wheel position error.

6. The method of claim 5, wherein the computing the rear wheel steering offset comprises applying at least one of a proportional coefficient, and integral coefficient, and a derivative coefficient to the filtered steering wheel position error.

7. The method of claim 1, wherein the determining the steering wheel position error is based on a steering wheel position when the vehicle is driving the straight-line path and a predefined steering wheel position.

8. The method of claim 1, wherein the determining when the vehicle is driving a straight-line path is based on at least one of compass data, global position system data, yaw velocity data, tire rotational speed data.

9. A system for aligning a steering system of a vehicle, comprising:
   a rear wheel steering system; and
   a control module that determines a steering wheel position error when the vehicle is driving the straight-line path, that computes a rear wheel steering offset based on the steering wheel position error and a closed loop control method, and that generates a control signal to the rear wheel steering system based on the rear wheel steering offset.

10. The system of claim 9, wherein the control module computes the rear wheel steering offset based on proportional control.

11. The system of claim 9, control module computes the rear wheel steering offset based on integral control.

12. The system of claim 9, wherein the control module computes the rear wheel steering offset based on derivative control.

13. The system of claim 9, wherein the control module applies a low pass filter to the steering wheel position error and wherein control module computes the rear wheel steering offset based on the filtered steering wheel position error.

14. The system of claim 13, wherein the control module computes the rear wheel steering offset based on at least one of proportional control, integral control, and derivative control of the filtered steering wheel position error.

15. The system of claim 9, wherein the control module determines the steering wheel position error based on a steering wheel position when the vehicle is driving the straight-line path and a predefined desired steering wheel position.

16. The system of claim 9, wherein the control module determines when the vehicle is driving a straight-line path based on data from at least one of a compass, a global position system, a yaw velocity sensor, and a tire speed sensor.

17. The system of claim 9, wherein the rear wheel steering system adjusts an angle of rear wheels of the vehicle based on the rear wheel steering offset.

18. The system of claim 17, further comprising a front wheel steering system that controls an angle of front wheels of the vehicle to a substantially similar angle offset when the angle of the rear wheels is adjusted to the rear wheel angle offset.

19. A vehicle, comprising:
    a rear wheel steering system;
    a front wheel steering system; and
    a control module that determines a misalignment associated with the front wheel steering system, and that generates a control signal to the rear wheel steering system based on the misalignment and a closed loop control method.

20. The vehicle of claim 19, wherein the control module computes a rear wheel steering offset based on at least one of proportional control, integral control, and derivative control.

* * * * *